United States Patent
Pankanti et al.

(10) Patent No.: US 12,467,635 B2
(45) Date of Patent: Nov. 11, 2025

(54) WATER RESERVOIR ASSEMBLY FOR AN OVEN INCLUDING A FABRIC THAT REDUCES STEAM TRANSMISSION TO EXTERNAL ENVIRONMENT

(71) Applicant: WHIRLPOOL CORPORATION, Benton Harbor, MI (US)

(72) Inventors: Raakesh Pankanti, Hyderabad (IN); Harishkumar, Kalaburagi (IN); Karthik Sandhragiri, Hyderabad (IN)

(73) Assignee: Whirlpool Corporation, Benton Harbor, MI (US)

( * ) Notice: Subject to any disclaimer, the term of this patent is extended or adjusted under 35 U.S.C. 154(b) by 418 days.

(21) Appl. No.: 17/562,655

(22) Filed: Dec. 27, 2021

(65) Prior Publication Data
US 2023/0204221 A1 Jun. 29, 2023

(51) Int. Cl.
*F24C 15/32* (2006.01)
*A47J 27/04* (2006.01)
*F24C 15/00* (2006.01)

(52) U.S. Cl.
CPC ............ *F24C 15/327* (2013.01); *A47J 27/04* (2013.01); *A47J 2027/043* (2013.01)

(58) Field of Classification Search
CPC ... A47J 2027/043; A47J 27/04; F24C 15/003; F24C 15/327
See application file for complete search history.

(56) References Cited

U.S. PATENT DOCUMENTS

| | | | | |
|---|---|---|---|---|
| 157,897 | A * | 12/1874 | Welch | A47J 27/04 126/369 |
| 224,699 | A * | 2/1880 | June | A01J 9/02 209/403 |
| 4,173,604 | A * | 11/1979 | Dimacopoulos | A61L 9/122 239/45 |
| 5,337,703 | A * | 8/1994 | Schlesch | F22B 1/284 392/394 |
| 6,086,758 | A * | 7/2000 | Schilling | B01D 39/1623 210/485 |

(Continued)

FOREIGN PATENT DOCUMENTS

| | | |
|---|---|---|
| CN | 201539900 U | 8/2010 |
| CN | 106724769 A | 5/2017 |

(Continued)

*Primary Examiner* — Michael G Hoang
*Assistant Examiner* — Logan P Jones
(74) *Attorney, Agent, or Firm* — Price Heneveld LLP

(57) ABSTRACT

An oven including (i) a cooking chamber; and (ii) a water reservoir assembly comprising (a) an inlet, (b) a water storage chamber, (c) an outlet, (d) a fillable state where the inlet is accessible from an external environment to deposit water into the water storage chamber through the inlet, (e) a water supply state where the water reservoir assembly is inserted further into the oven than in the fillable state and the oven is configured to extract water from the water storage container via the outlet to supply steam to the cooking chamber, and (f) a fabric proximate the inlet through which water flows before flowing through the outlet. The fabric is sufficiently porous to permit water that is deposited into the inlet to flow through the fabric and into the water storage chamber of the water reservoir assembly.

15 Claims, 14 Drawing Sheets

(56) References Cited

U.S. PATENT DOCUMENTS

| | | | |
|---|---|---|---|
| 6,732,636 B1 * | 5/2004 | Germano | A47J 36/22 99/413 |
| 7,537,004 B2 | 5/2009 | Reay | |
| 10,420,176 B2 | 9/2019 | Lee et al. | |
| 10,945,444 B2 | 3/2021 | Kim et al. | |
| 2009/0250452 A1 | 10/2009 | Tse | |
| 2013/0193047 A1 * | 8/2013 | Catt Lyon | E03B 3/02 210/170.03 |
| 2014/0251304 A1 * | 9/2014 | Winkelmann | A47J 36/00 126/369 |
| 2021/0386233 A1 * | 12/2021 | Dell'Olio | F24C 15/003 |

FOREIGN PATENT DOCUMENTS

| | | | | |
|---|---|---|---|---|
| CN | 112890632 A | | 6/2021 | |
| DE | 3703857 A1 | | 2/1988 | |
| DE | 102010002853 A1 | | 9/2011 | |
| EP | 1192888 B1 | | 5/2005 | |
| EP | 2244010 A2 | | 10/2010 | |
| EP | 2363057 A1 | * | 9/2011 | A47L 15/4418 |
| EP | 2462808 A1 | * | 6/2012 | A21B 3/04 |
| EP | 2502542 A1 | | 9/2012 | |
| EP | 1955621 B1 | | 4/2013 | |
| EP | 2409571 B1 | | 9/2013 | |
| JP | 2002119423 A | | 4/2002 | |
| JP | 2006015238 A | * | 1/2006 | |
| JP | 4785657 B2 | * | 10/2011 | F24C 15/327 |
| KR | 100550572 B1 | | 2/2006 | |

\* cited by examiner

WATER RESERVOIR ASSEMBLY FOR AN OVEN INCLUDING A FABRIC THAT REDUCES STEAM TRANSMISSION TO EXTERNAL ENVIRONMENT

BACKGROUND OF THE DISCLOSURE

The present disclosure generally relates to a water reservoir assembly for an oven with steam cooking functionality, and more specifically, to a water reservoir assembly that reduces or eliminates the transmission of oven generated steam through the water reservoir assembly and into the external environment.

Some ovens have the capability to cook a food item in the presence of steam. For example, some ovens include a reservoir that the user can fill with liquid water (hereinafter, liquid water is referred to simply as "water" while water in a predominantly gaseous state is referred to as "steam"). The oven then transforms the water from the reservoir into steam to deliver to an environment around the food item during cooking thereof. However, there is a problem in that steam and water tend to escape from the reservoir during use of the oven, including when the user adds water to the reservoir.

SUMMARY OF THE DISCLOSURE

The present disclosure solves that problem with a water reservoir assembly that includes an inlet that leads to a water storage chamber and fabric disposed at the inlet. Water that the user adds to the water storage chamber must pass through the fabric at the inlet. The fabric acts as physical barrier that prevents or reduces backflow of steam and water from the water storage chamber through the inlet and into an external environment surrounding the oven. The fabric is sufficiently porous to permit passage of water that the user intends to add to the water storage chamber for use in a steam cooking function of the oven, but sufficiently non-porous to prevent or reduce the backflow of steam or water.

According to one aspect of the present disclosure, an oven comprises (i) a cooking chamber; (ii) a cabinet at least a partially surrounding the cooking chamber; and (iii) a water reservoir assembly comprising (a) an inlet, (b) a water storage chamber, (c) an outlet, (d) a fillable state where the water reservoir assembly is at least partially extracted from the cabinet and the inlet is accessible from an external environment to deposit water into the water storage chamber through the inlet, (e) a water supply state where the water reservoir assembly is inserted further into the oven than in the fillable state and the oven is configured to extract water from the water storage container via the outlet to supply steam to the cooking chamber, and (f) a fabric proximate the inlet through which water flows before flowing through the outlet. In embodiments, the fabric is sufficiently porous to permit water that is deposited into the inlet to flow through the fabric and into the water storage chamber of the water reservoir assembly. In embodiments, the fabric prevents at least a portion of steam that backflows through the outlet of the water reservoir assembly and into the water storage chamber from escaping out of the inlet and into the external environment. In embodiments, the water reservoir assembly further comprises a structural support proximate the inlet that extends into the water storage chamber, and the fabric is coupled to the structural support. In embodiments, the structural support is movable to, from, and between (i) a separated state where the structural support and the fabric coupled thereto are separated from the water reservoir assembly and (ii) a coupled state where the structural support is coupled to the water reservoir assembly. In embodiments, the fabric is non-woven. In embodiments, the fabric comprises (i) a top portion disposed proximate the inlet of the water reservoir assembly and (ii) a bottom portion that extends into the water storage chamber and is elevated lower than the top portion. In embodiments, the fabric comprises layered sheets. In embodiments, the water storage chamber is defined at least in part by a bottom surface. In embodiments, the fabric is separated from the bottom surface.

In embodiments, the water reservoir assembly further comprises (i) a top piece through which the inlet is disposed and (ii) a bottom piece that defines the water storage chamber, the bottom piece being coupled to the top piece. In embodiments, the water reservoir assembly further comprises a structural support that sits upon the top piece and extends through the inlet into the water storage chamber. In embodiments, the fabric is coupled to the structural support. In embodiments, the structural support comprises (i) a lip that sits upon the top piece and (ii) support bars that extend downward from the lip and under the fabric.

In embodiments, the water reservoir assembly further comprises a front and a rear. In embodiments, the water storage chamber comprises a bottom surface that slopes downward from the front to the rear. In embodiments, the inlet is disposed closer to the front than the rear of the water reservoir assembly.

In embodiments, (i) the front of the water reservoir assembly is open to the external environment when the water reservoir assembly is in the water supply state and (ii) the rear faces an opposite direction as the front. In embodiments, the inlet is disposed closer to the front of the water reservoir assembly than the rear of the water reservoir assembly.

In embodiments, the water reservoir assembly further comprises (i) a first side and a second side, facing an opposite direction as the first side, that extend between the front and the rear, and (ii) a width between the first side and the second side, the width extending through the inlet. In embodiments, the inlet has a width that is parallel to the width of the water reservoir assembly, and the width of the inlet is at least 50% of the width of the water reservoir assembly. In embodiments, the inlet has a length that is orthogonal to the width of the inlet, and the length of the inlet is within a range of from 50% to 150% of the width of the inlet.

According to another aspect of the present disclosure, a water reservoir assembly for an oven comprises: (i) a water storage chamber; (ii) an inlet into the water storage chamber configured to accept water for storage in the water storage chamber; (iii) an outlet configured to supply water from the water storage chamber through the outlet to a steam generation system of an oven that is configured to transform the water into steam for use during a cooking operation; and (iv) a fabric proximate the inlet through which water flows to the water storage chamber.

In embodiments, the water reservoir assembly further comprises (i) a top piece through which the inlet is disposed; (ii) a bottom piece that defines the water storage chamber, the bottom piece being coupled to the top piece; and (iii) a structural support that sits upon the top piece and extends through the inlet into the water storage chamber; wherein, the fabric is coupled to the structural support. In embodiments, the structural support comprises (i) a lip that sits upon the top piece and (ii) support bars that extend downward from the lip and parallel to the lip under the fabric.

These and other features, advantages, and objects of the present disclosure will be further understood and appreciated by those skilled in the art by reference to the following specification, claims, and appended drawings.

Figure 1:
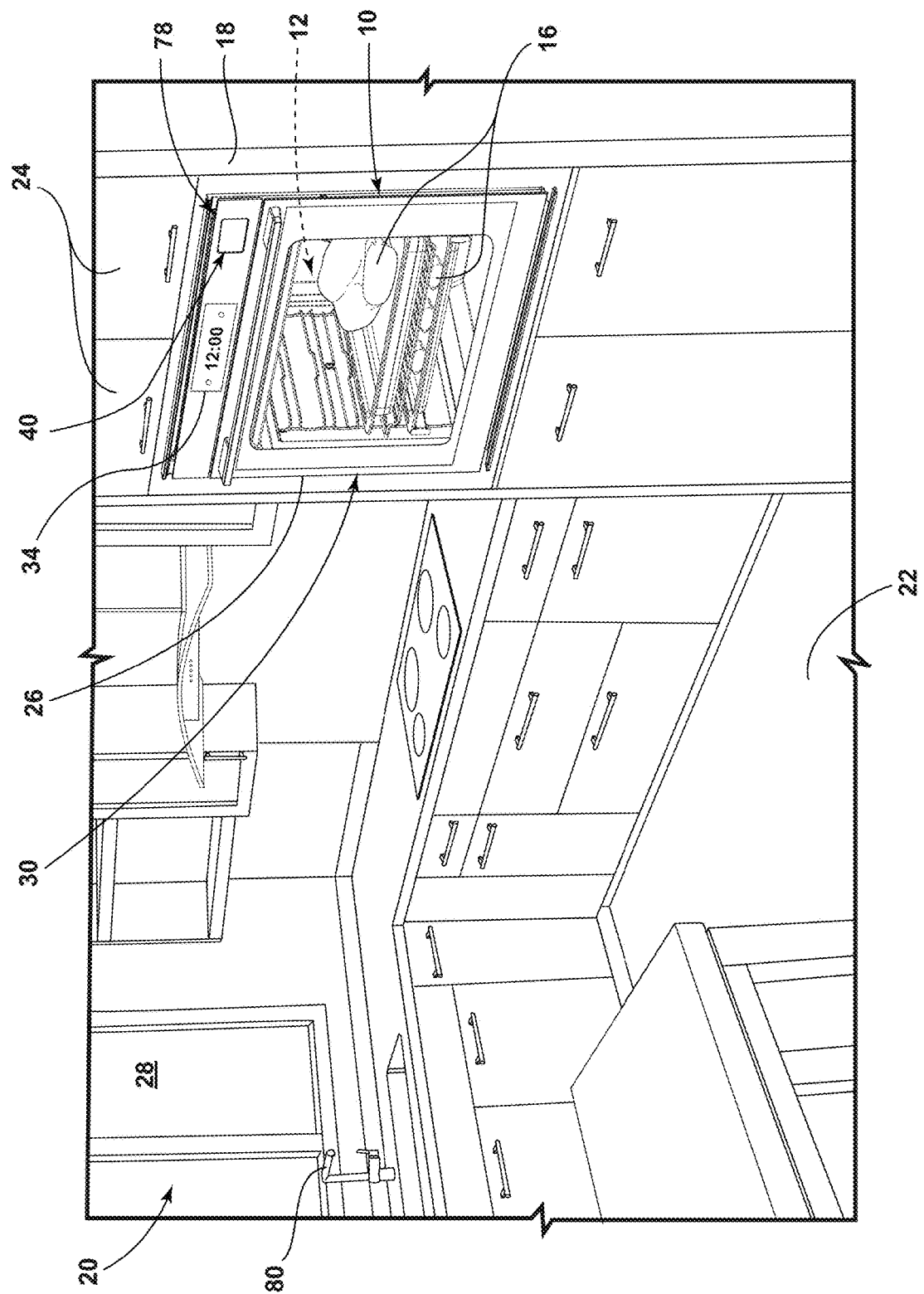
FIG. 1 is a view of a kitchen that includes an oven with a water reservoir assembly of the present disclosure in a water supply state capable of providing water to a steam generation system of the oven to supply steam into a cooking chamber of the oven while cooking one or more food items disposed therein.

The components in the figures are not necessarily to scale, emphasis instead being placed upon illustrating the principles described herein.

DETAILED DESCRIPTION

The present illustrated embodiments reside primarily in combinations of method steps and apparatus components related to a water reservoir assembly for an oven that has steam cooking functionality. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
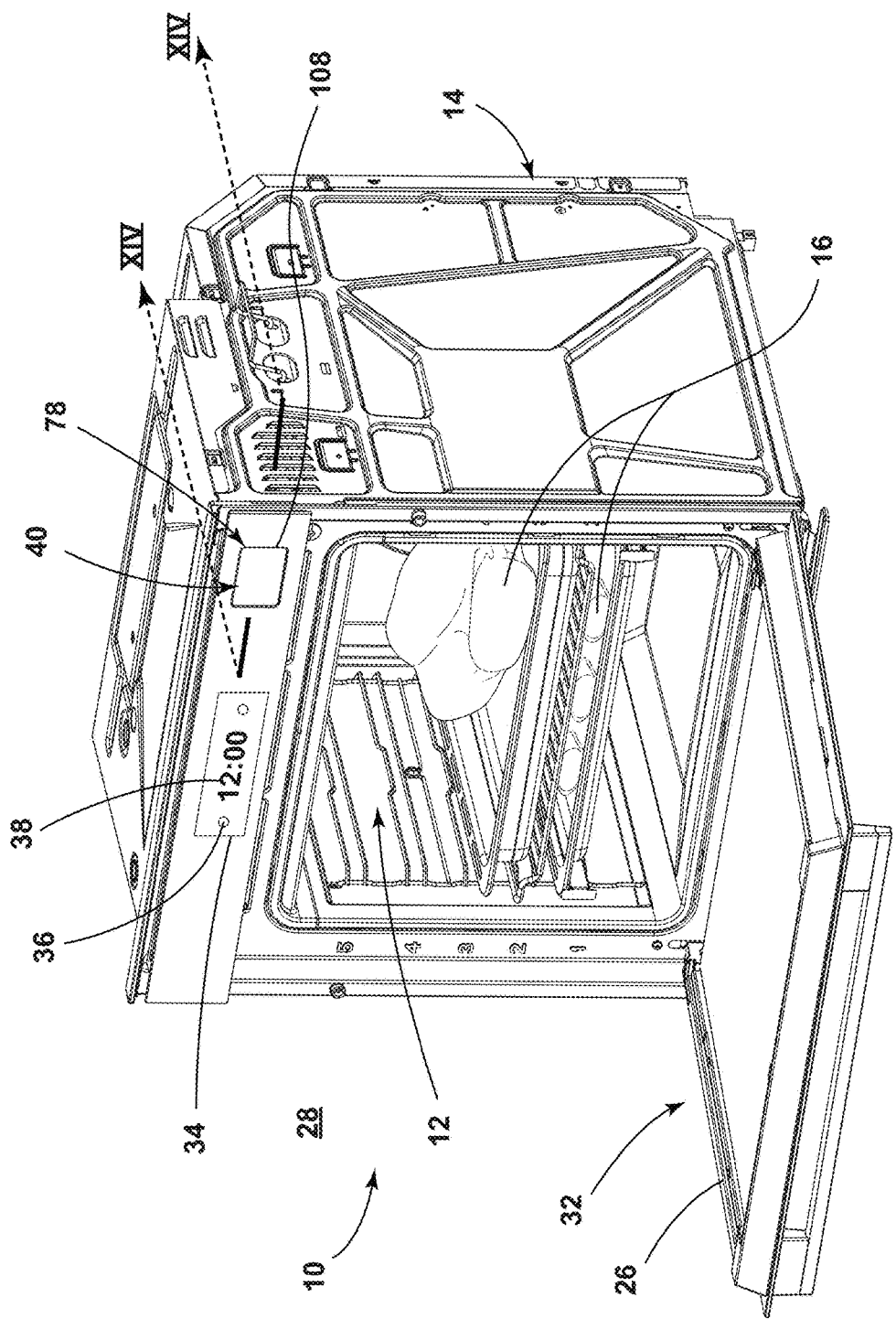
FIG. 2 is a perspective view of the oven of FIG. 1 with the door in an open position that allows access to the cooking chamber from an external environment.
Figure 3:
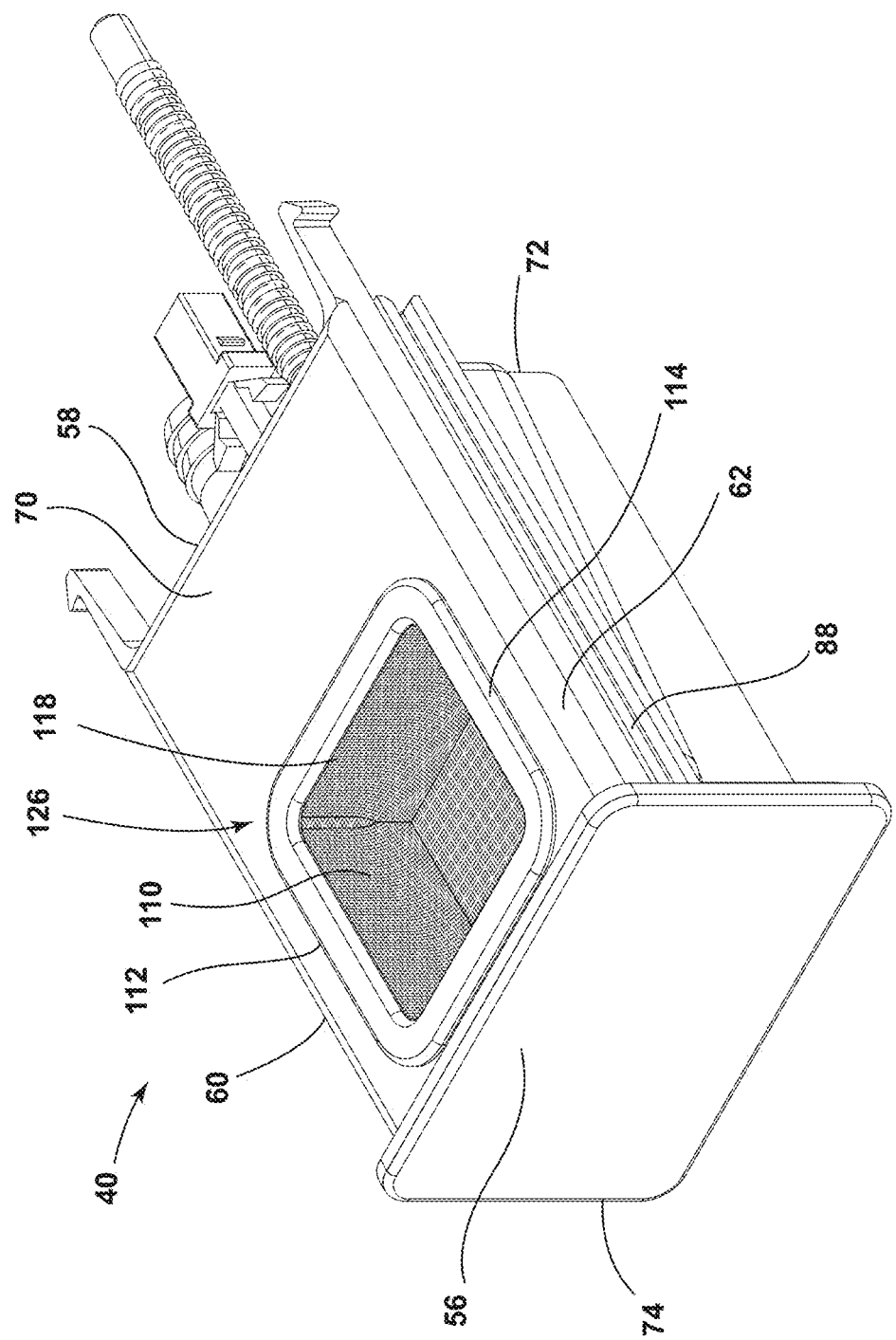
FIG. 3 is a perspective view of the water reservoir assembly of FIG. 1, illustrating a top piece and a structural support that structurally supports fabric in a coupled state coupled to the top piece.
Figure 4:
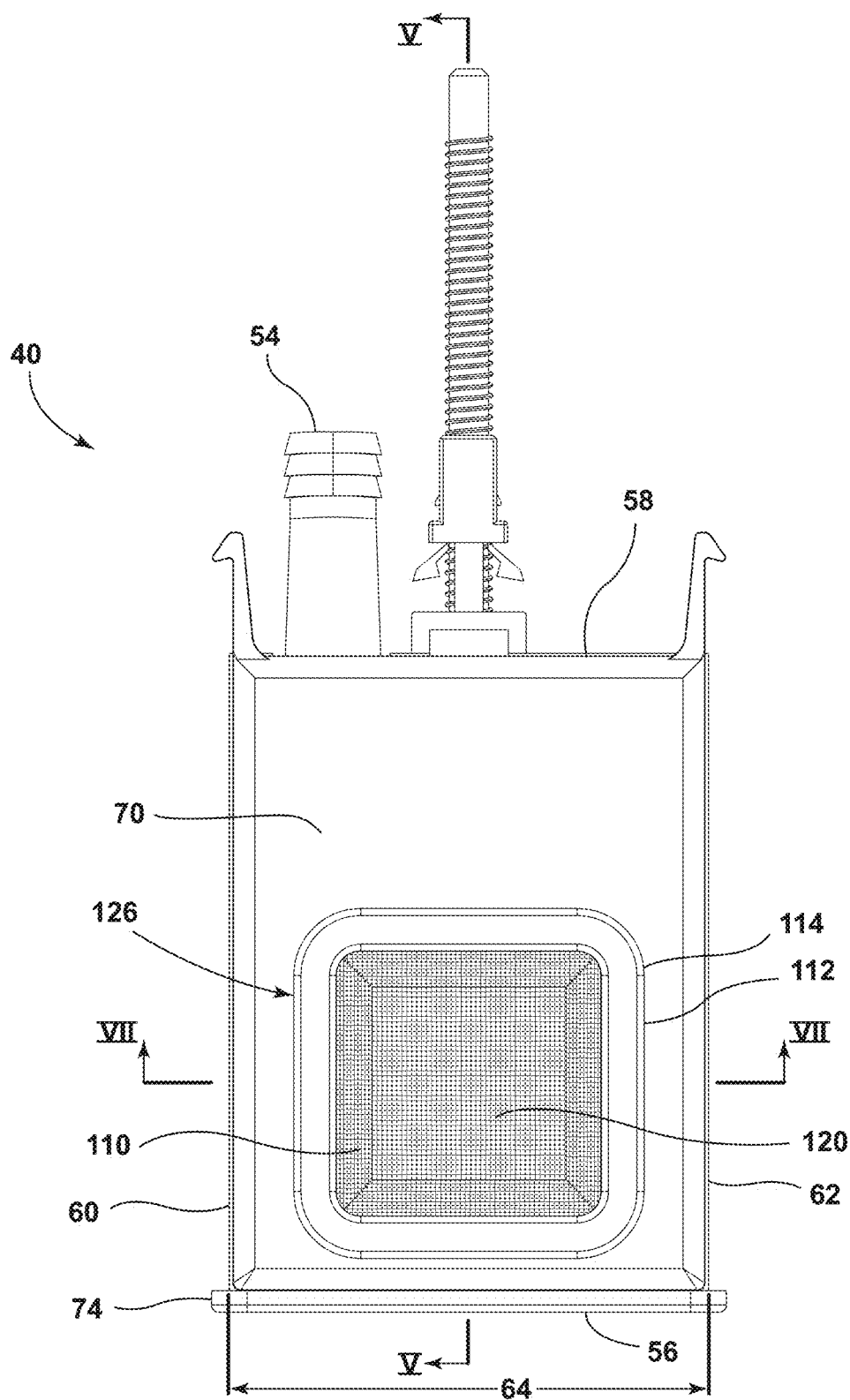
FIG. 4 is an overhead view of the water reservoir assembly of FIG. 1.
Figure 5:
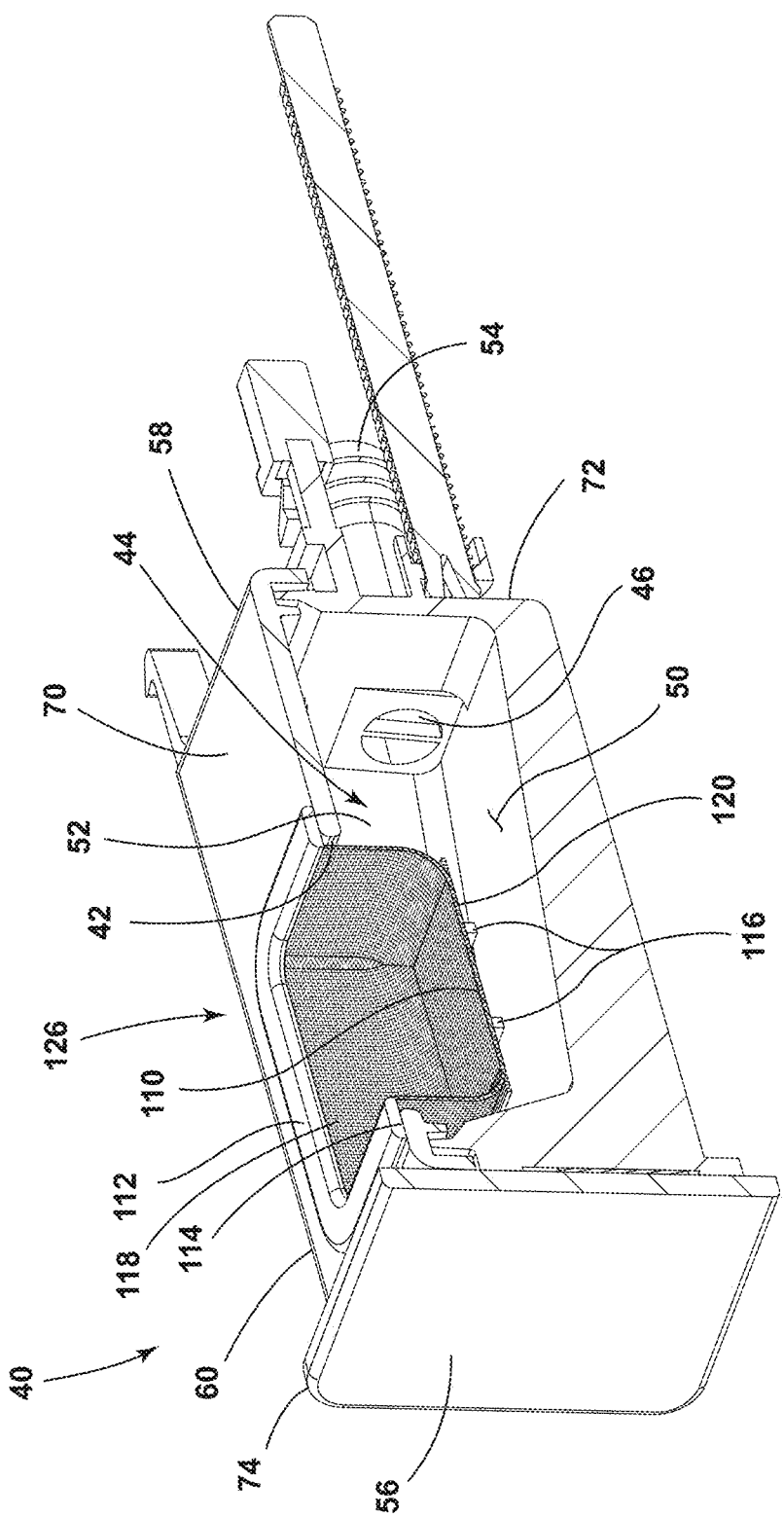
FIG. 5 is a perspective view of a cross-section of the water reservoir assembly of FIG. 1 taken through line V-V of FIG. 4, illustrating the water reservoir assembly further including an inlet at the top piece and a bottom piece connected to the top piece, and the bottom piece defining a water storage chamber so that water deposited through the fabric at the inlet flows into the water storage chamber.
Figure 6:
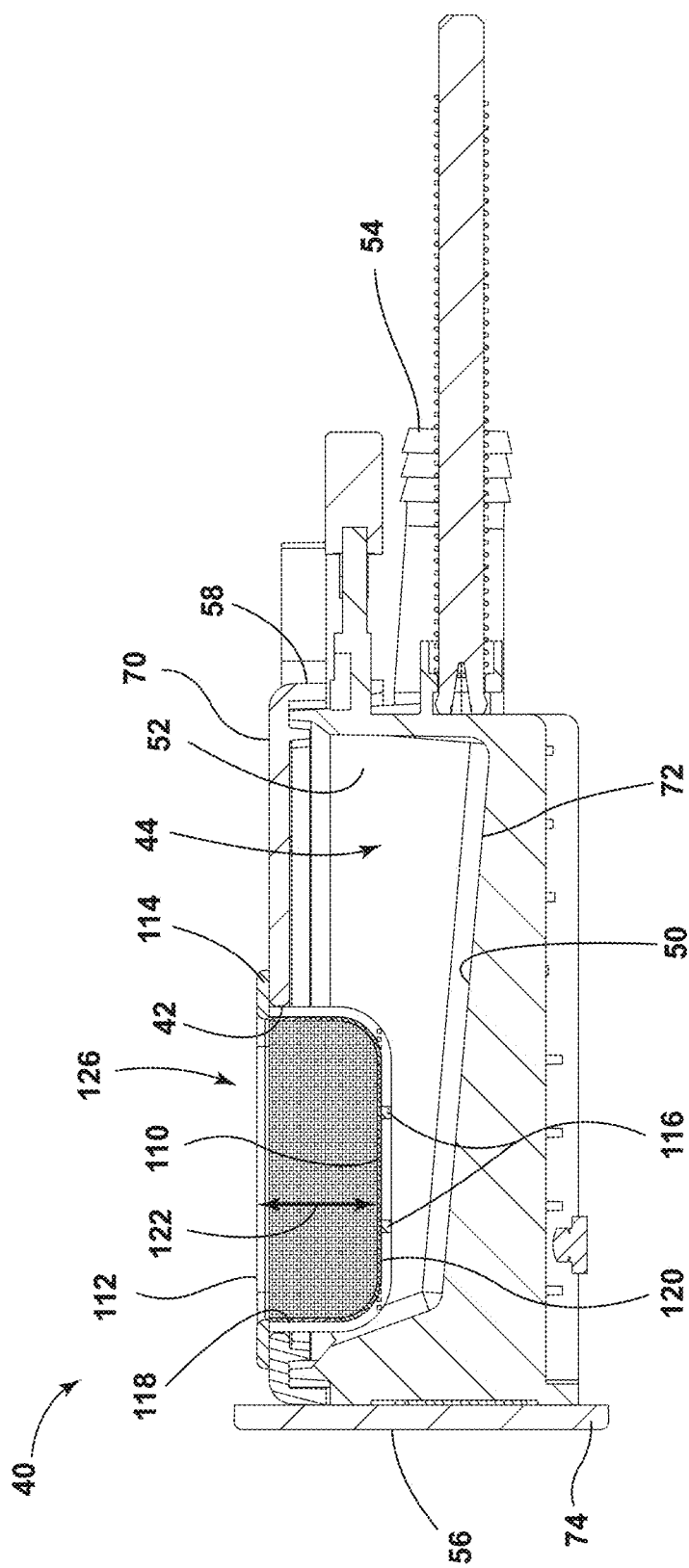
FIG. 6 is an elevation view of the same cross-section illustrated at FIG. 5, illustrating the water reservoir assembly further including a bottom surface that partially defines the water storage chamber, and the bottom surface sloping downwards from a front towards a rear of the water reservoir assembly.
Figure 7:
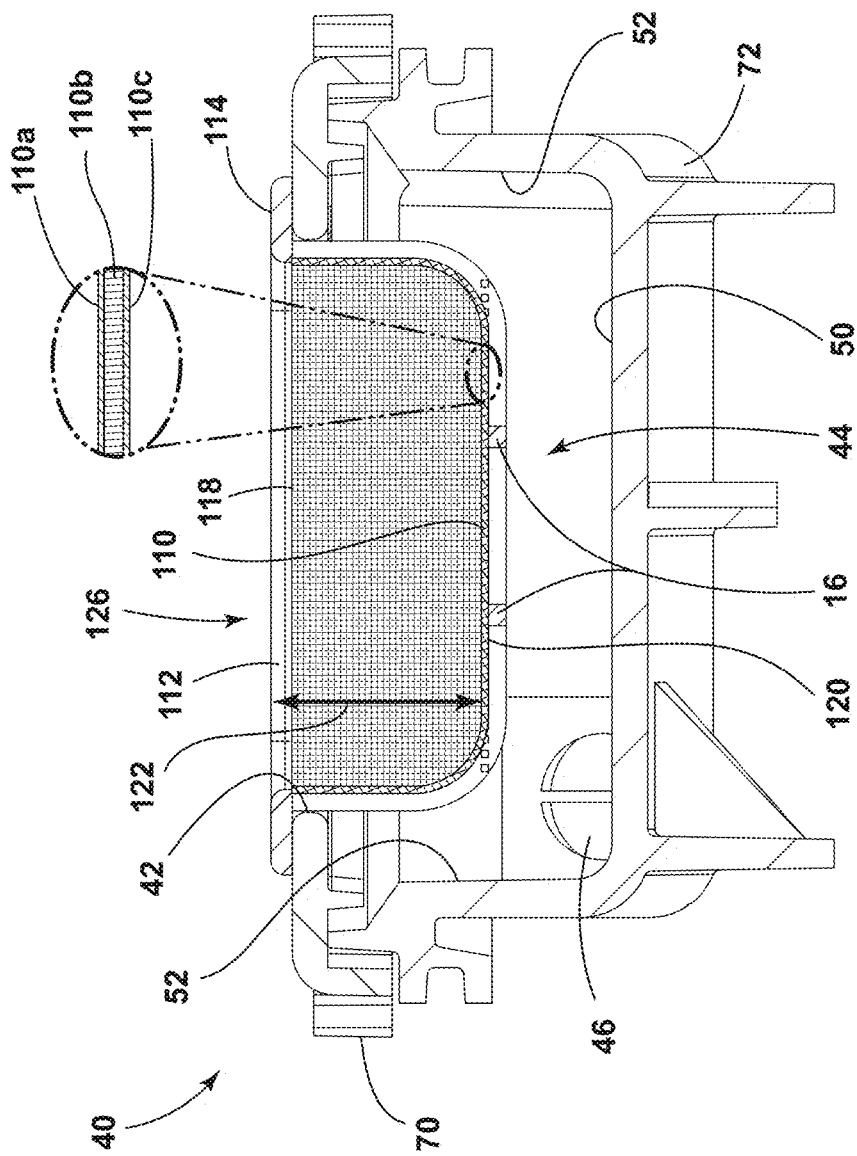
FIG. 7 is an elevation view of a cross-section of the water reservoir assembly of FIG. 1 taken through line VII-VII of FIG. 4, illustrating the water reservoir assembly further including an outlet allowing the steam generation system of the oven to draw water from the water storage chamber via the outlet, and the fabric having a depth defined by the structural support supporting the fabric.
Figure 8:
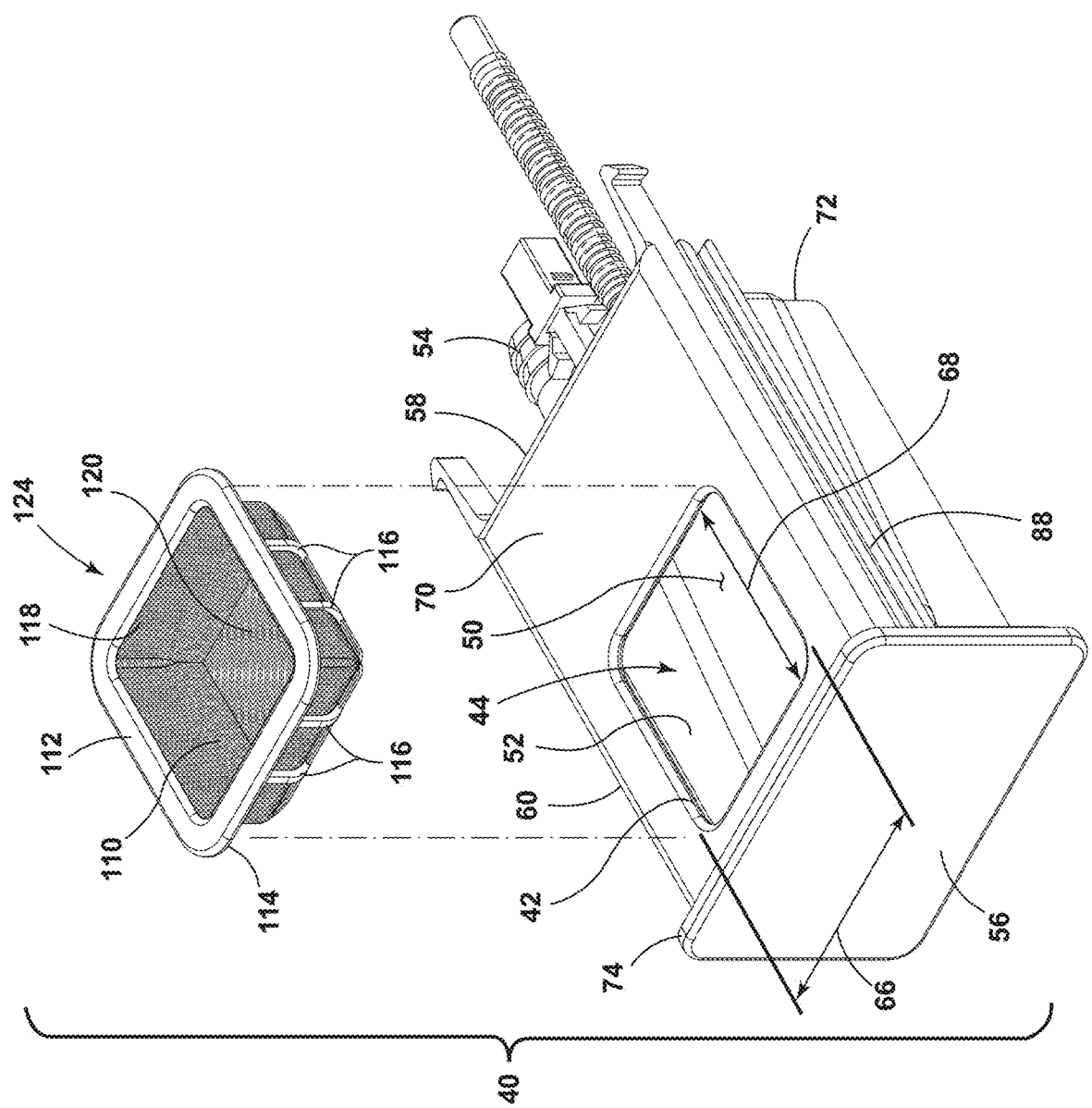
FIG. 8 is a perspective view of the water reservoir assembly of FIG. 1, illustrating the inlet into the water storage chamber and the structural support (with the fabric) in a separated state that is separated from the inlet and the remainder of the water reservoir assembly.
Figure 9:
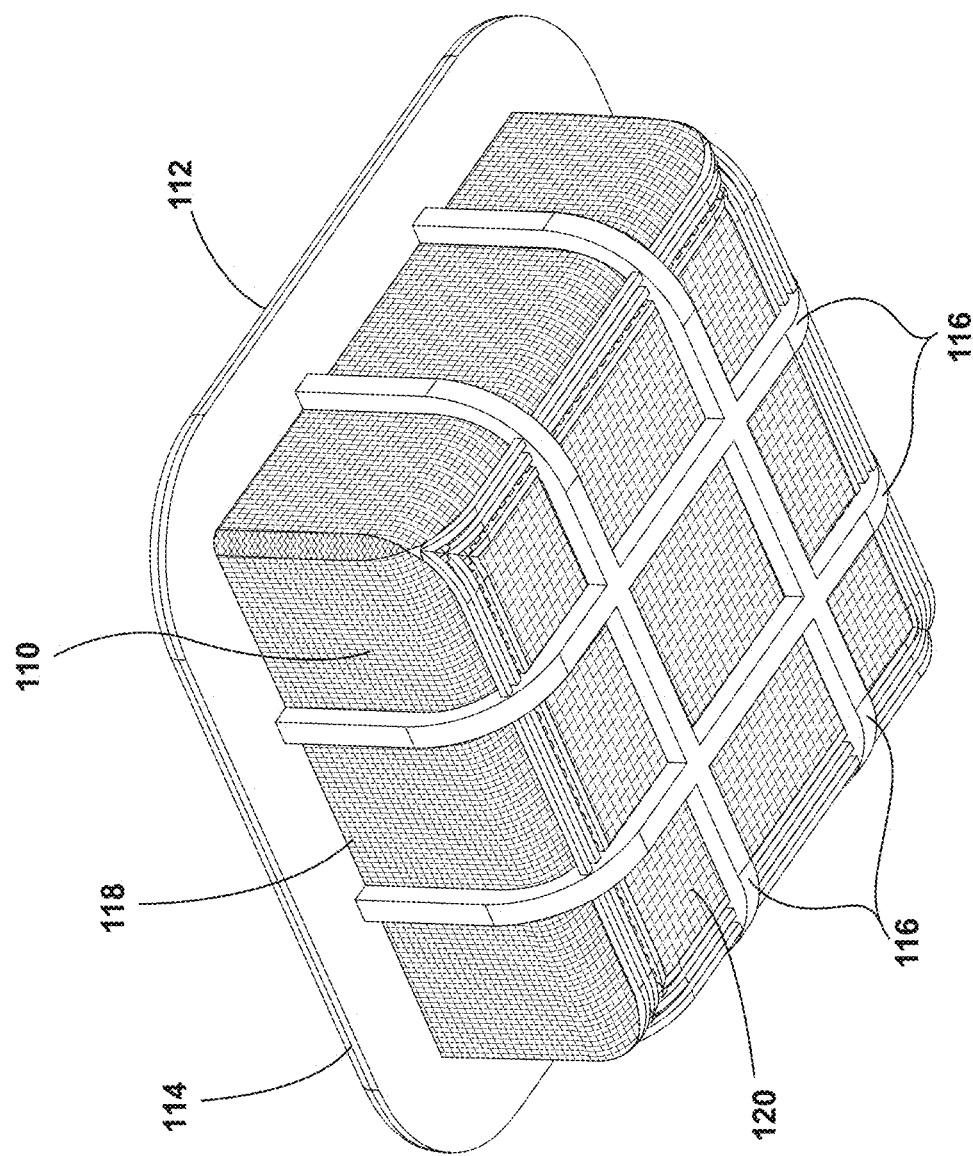
FIG. 9 is a bottom perspective view of the structural support with the fabric, illustrating the structural support including (i) a lip allowing the structural support to sit upon the top piece of the water reservoir assembly and (ii) support bars extending downward from the lip and under the fabric, so the support bars and the fabric can extend through the inlet and into the water storage chamber.
Figure 10:
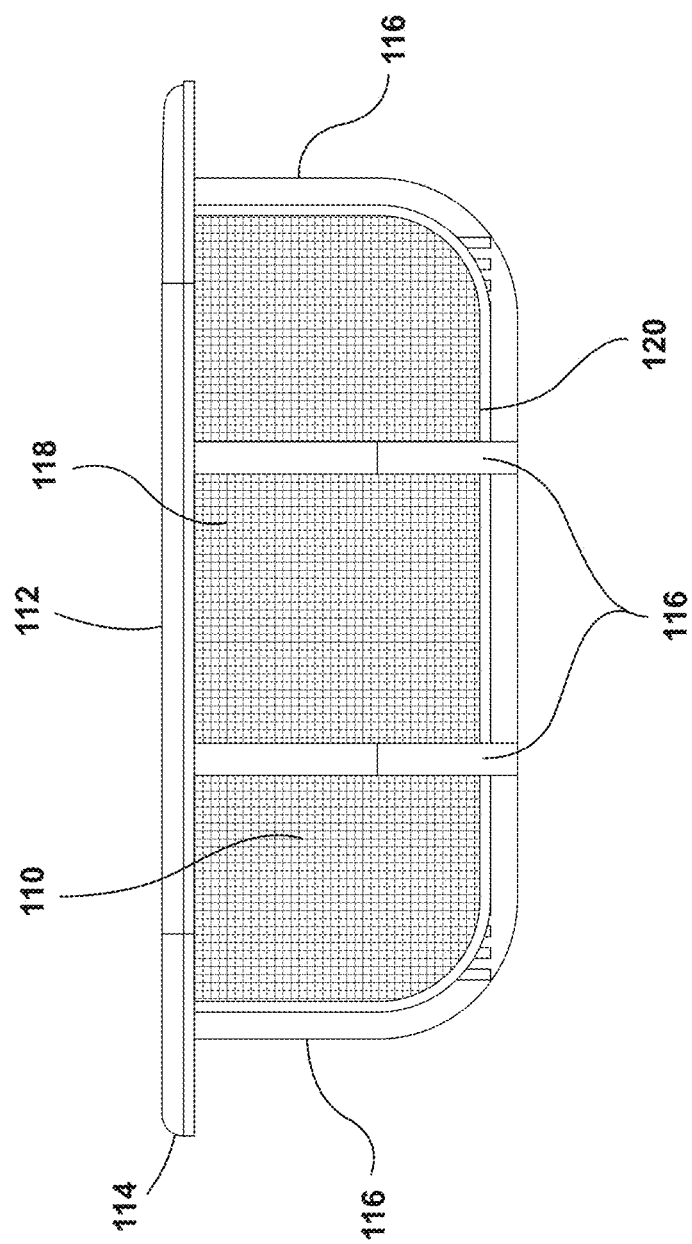
FIG. 10 is an elevation view of the structural support with the fabric, illustrating the fabric including a top portion disposed near the lip and a bottom portion that is less elevated than the top portion.
Figure 11:
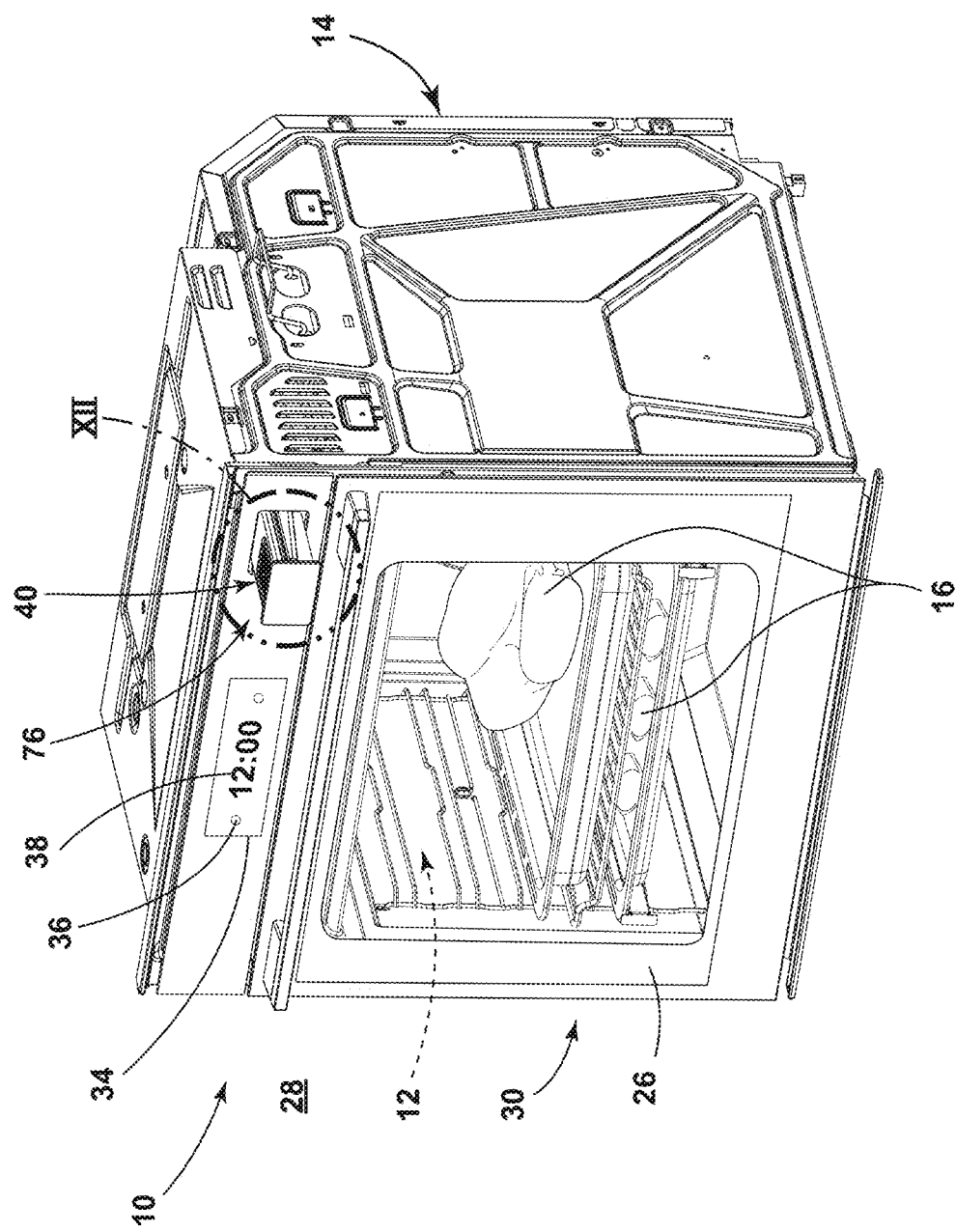
FIG. 11 is a perspective view of the oven of FIG. 1, illustrating the water reservoir assembly in a fillable state, where the inlet of the water reservoir assembly is open to the external environment allowing a user to deposit water into the water storage chamber through the inlet and the fabric.
Figure 12:
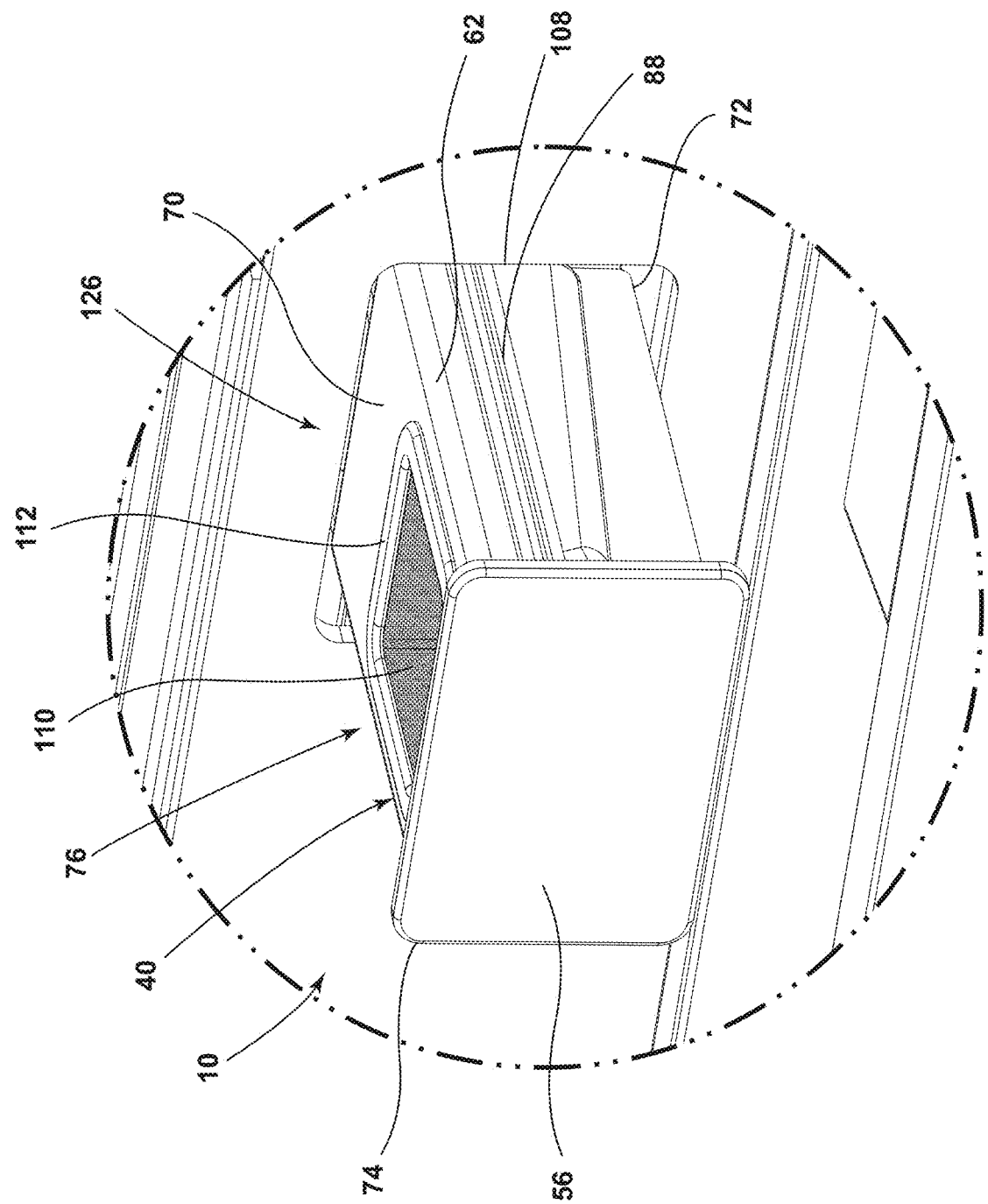
FIG. 12 is a close up view of area XII of FIG. 11, illustrating the structural support with the fabric in a coupled state so that the water that the user deposits must pass through the fabric before reaching the water storage chamber.
Figure 13:
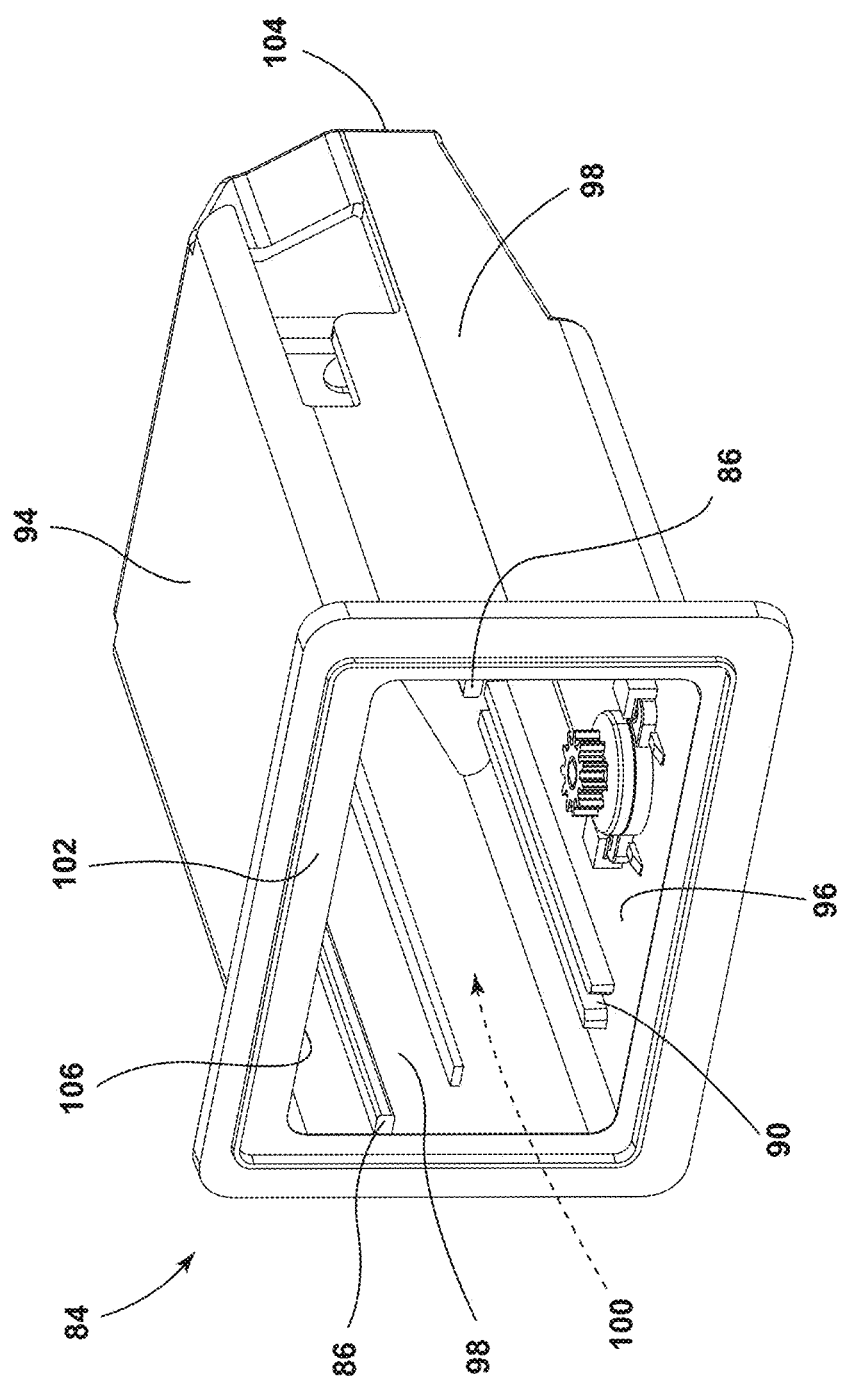
FIG. 13 is a perspective view of a housing for the water reservoir assembly of the oven of FIG. 1, illustrating (i) a chamber within which the water reservoir assembly resides while in the water supply state and (ii) guide rails and a slot that cooperate with slots and a guide rail of the water reservoir assembly to guide movement of the water reservoir assembly to, from, and between the water supply state and the fillable state.
Figure 14:
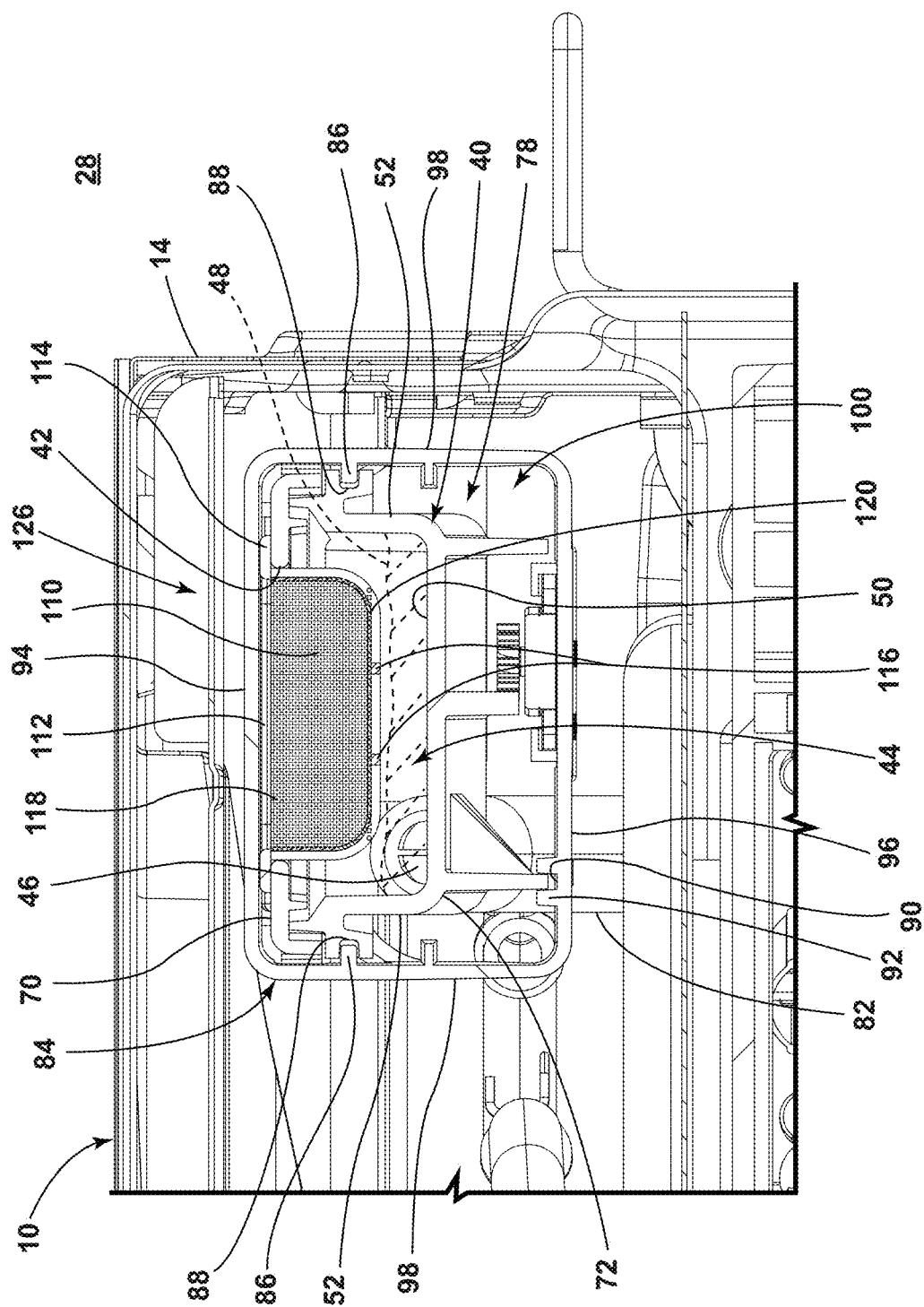
FIG. 14 is an elevation view of a cross-section of the oven of FIG. 1 taken through line XIV-XIV of FIG. 2, illustrating the water reservoir assembly disposed within the housing.

Referring to FIGS. 1 and 2, an oven 10 includes a cooking chamber 12 and a cabinet 14 at least partially surrounding the cooking chamber 12. The oven 10 is configured to cook one or more food items 16 that are disposed within the cooking chamber 12, such as with a heating element that increases a temperature of the one or more food items 16 disposed within the cooking chamber 12 via electrical resistance, microwave emissions, or the combustion of a gas (e.g., natural gas, propane, butane, and so on). The oven 10 may be considered to be a "wall oven," as illustrated at FIG. 1, where the cabinet 14 of the oven 10 is mostly hidden behind paneling 18 or other structural features of a kitchen 20 or another room where the oven 10 is disposed. The oven 10 may be elevated in such instances from a floor 22 of the kitchen 20 or another room where the oven 10 is disposed. In other embodiments, the oven 10 is part of a "range" unit and further includes a cooktop (not illustrated) disposed above the cooking chamber 12. In such embodiments, the oven 10 (i) may be of the "slide-in" variety where cabinetry 24, paneling 18, or other structural features within the kitchen 20 (or other room) generally hides the cabinet 14 of the oven 10, or (ii) may be of the "freestanding" variety where cabinetry 24, paneling 18, or other structural features of the kitchen 20 (or other room) do not hide the cabinet 14 of the oven 10 but, rather, a covering (not illustrated) covers the cabinet 14 of the oven 10.

The oven 10 further includes a door 26 to selectively deny or allow access to the cooking chamber 12 from an external environment 28. The door 26 includes a closed position 30 (FIG. 1) where the door 26 denies access to the cooking chamber 12 from the external environment 28. In addition, the door 26 includes an open position 32 (see, e.g., FIG. 2) where the door 26 allows access to the cooking chamber 12 from the external environment 28. The door 26 is able to move to, from, and between the closed position 30 and the open position 32. The door 26 may be in the closed position 30 while the oven 10 is cooking the one or more food items 16, so that the cooking chamber 12 better retains heat that the oven 10 generates. A user of the oven 10 may transition the door 26 from the closed position 30 to the open position 32 to place the one or more food items 16 into the cooking chamber 12 or to remove the one or more food items 16 from the cooking chamber 12, such as after the oven 10 has cooked the one or more food items 16.

In embodiments, the oven 10 further includes a human-machine interface 34. The human-machine interface 34 may include buttons 36, a touch screen display 38, among other items that allow the user to control operation of the oven 10. The human-machine interface 34 is usable from the external environment 28, and, in embodiments, is disposed above the door 26.

Referring now additionally to FIGS. 3-14, the oven 10 further includes a water reservoir assembly 40. In embodiments, the water reservoir assembly 40 is for use with a steam cooking function of the oven 10. The water reservoir assembly 40 includes an inlet 42 (see particularly FIG. 8), a water storage chamber 44, and an outlet 46. The inlet 42 of the water reservoir assembly 40 leads to the water storage chamber 44. The inlet 42 is configured to accept water 48 (see FIG. 14) for storage in the water storage chamber 44. For example the inlet 42 is disposed elevationally above the water storage chamber 44 so that gravity forces the water 48 to flow through the inlet 42 into the water storage chamber 44. The user deposits water 48 through the inlet 42 of the water reservoir assembly 40 and the water 48 enters the water storage chamber 44. The water storage chamber 44 stores the water 48 until the oven 10 extracts the water 48 from the water storage chamber 44 to generate steam therefrom for a steam cooking function. In embodiments, the water storage chamber 44 is defined at least in part by a bottom surface 50 and side walls 52 that extend upward therefrom. The oven 10 draws water 48 from the water storage chamber 44 through the outlet 46. In embodiments, as illustrated, the outlet 46 is disposed through one of the side walls 52 that define the water storage chamber 44. In other embodiment, the outlet 46 is disposed through the bottom surface 50 that defines the water storage chamber 44. The outlet 46 is configured to supply water 48 from the water storage chamber 44 through the outlet 46 to the steam generation system of the oven 10, which is configured to transform the water 48 into steam for using during a steam cooking function. For example, the outlet 46 is in fluid flow communication with the water storage chamber 44 and, in embodiments, is in fluid flow communication with a conduit 54 of the water reservoir assembly 40. Steam generation systems for ovens are known in the art, and include any system that heats the water 48 into steam, which is then introduced into the cooking chamber 12 during cooking of the one or more food items 16. An example of the steam generation system is set forth in United States Patent Application Publication US20190309956A1 (published 10 Oct. 2019, assigned to Whirlpool Corporation), now United States Patent No. US11608988B2, and said publication is incorporated herein by reference in its entirety.

The water reservoir assembly 40 further comprises a front 56 and a rear 58. The rear 58 is disposed closer to the outlet 46 than the front 56 and faces a direction that is an opposite direction as a direction that the rear 58 faces. The inlet 42 into the water storage chamber 44 is disposed closer to the front 56 than the rear 58. In embodiments, the front 56 is disposed closer to the external environment 28 than the rear 58. In embodiments, the bottom surface 50 slopes downward from the front 56 to the rear 58. With the outlet 46 disposed at the rear 58, the slope of the bottom surface 50 that is downward towards the rear 58 directs water 48 within the water storage chamber 44 toward the outlet 46.

The water reservoir assembly 40 further includes a first side 60 and a second side 62, which are generally orthogonal to the front 56 and the rear 58 and extend between the front 56 and the rear 58. The first side 60 and the second side 62 face in opposite directions. The water reservoir assembly 40 thus has a width 64 (see FIG. 4) between the first side 60 and the second side 62. The width 64 is the shortest straight-line distance that is parallel with horizontal and extends through the inlet 42. The inlet 42 also has a width 66 (see FIG. 8). The width 66 of the inlet 42 is the shortest straight-line distance that is parallel with horizontal and parallel to the width 64 of the water reservoir assembly 40. In embodiments, the width 66 of the inlet 42 is at least 50% of the width 64 of the water reservoir assembly 40. In addition, the inlet 42 has a length 68 that is orthogonal to the width 66 of the inlet 42 and parallel with horizontal. In embodiments, the length 68 of the inlet 42 is within a range of from 50% to 150% of the width 66 of the inlet 42. The inlet 42 can take any shape (e.g., generally square, generally rectangular, generally circular, or a shape that avoids common definition). The larger the width 66 of the inlet 42 relative to the width 64 of the water reservoir assembly 40 eases the ability of the user to deposit water 48 through the inlet 42 into the water storage chamber 44.

In embodiments, the water reservoir assembly 40 further includes a top piece 70 and a bottom piece 72. The top piece 70 and the bottom piece 72 are coupled, such as through a snap-fit attachment. The inlet 42 into the water storage chamber 44 is disposed through the top piece 70. The bottom piece 72 defines the water storage chamber 44. In such embodiments, the bottom piece 72 provides the bottom surface 50, the side walls 52, and the outlet 46, and the bottom piece 72 retains the water 48 added to the water reservoir assembly 40 through the inlet 42. In embodiments, the water reservoir assembly 40 further includes a faceplate 74 that provides the front 56 of the water reservoir assembly 40.

The water reservoir assembly 40 further includes a fillable state 76 (FIGS. 11 and 12) and a water supply state 78 (e.g., FIG. 1). In the fillable state 76, the water reservoir assembly 40 is at least partially extracted from the cabinet 14, relative to the water supply state 78. In the fillable state 76, the inlet 42 is accessible from the external environment 28 for the user to deposit water 48 into the water storage chamber 44 through the inlet 42. In embodiments, in the fillable state 76, the water reservoir assembly 40 is fully separable from the remainder of the oven 10, allowing the user to move the water reservoir assembly 40 to a source of water 48 to deposit into the water storage chamber 44, such as a faucet 80 within the kitchen 20. In other embodiments, in the fillable state 76, the water reservoir assembly 40 remains coupled to the remainder of the oven 10 but the water reservoir assembly 40 is sufficiently extracted from the cabinet 14 to reveal the inlet 42 and allow the user to deposit water 48 into the water storage chamber 44 through the inlet 42. In such embodiments, the user brings the source of water 48 to the water reservoir assembly 40, such as a cup holding water 48 that is then poured into the water storage chamber 44 through the inlet 42.

In the water supply state 78, the water reservoir assembly 40 is inserted further into the oven 10, such as further into the cabinet 14, than in the fillable state 76. In embodiments, the front 56 of the water reservoir assembly 40 (e.g., the faceplate 74) is open to and visible from the external environment 28. However, incorporation of the faceplate 74 hides the top piece 70 and bottom piece 72 from a view of the user, while the water reservoir assembly 40 is in the water supply state 78. In embodiments, in the water supply state 78, the inlet 42 of the water reservoir assembly 40 is not accessible from the external environment 28 to deposit water through the inlet 42 into the water storage chamber 44. In the water supply state 78, the oven 10 is configured to extract water 48 from the water storage chamber 44 via the outlet 46 in order to supply steam to the cooking chamber 12. In embodiments, the conduit 54 of the water reservoir assembly 40 couples to tubing 82 (see FIG. 14) when the water reservoir assembly 40 is placed in the water supply state 78, and a pump or valve (not illustrated) causes water to be extracted from the water storage chamber 44 of the water reservoir assembly 40 via the outlet 46, the conduit 54, and the tubing 82 coupled to the conduit 54 in the water supply state 78.

In embodiments, such as illustrated, the oven 10 further includes a housing 84 (FIGS. 13-14) for the water reservoir assembly 40 that is disposed within the cabinet 14, such as above the cooking chamber 12 and rearward of the human-machine interface 34. The housing 84 generally encloses the water reservoir assembly 40 when the water reservoir assembly 40 is in the water supply state 78, and provides a structural guide and support for the water reservoir assembly 40 as the water reservoir assembly 40 moves to, from, and between the fillable state 76 and the water supply state 78. For example, in embodiments, the housing 84 includes guide-rails 86 that guide movement of the water reservoir assembly 40 to, from, and between the fillable state 76 and the water supply state 78. The guide-rails 86 of the housing 84 cooperate with slots 88 at the first side 60 and the second side 62 of the water reservoir assembly 40, and a slot 90 of the housing 84 cooperates with a guide-rail 92 of the water reservoir assembly 40, to guide movement of the water reservoir assembly 40 to, from, and between the fillable state 76 and the water supply state 78.

In embodiments, the housing 84 includes a top wall 94, a bottom wall 96, and opposing side walls 98 that form a chamber 100 within which the water reservoir assembly 40 is housed when the water reservoir assembly 40 is in the water supply state 78. In embodiments, one of each of the guide-rails 86 of the housing 84 is disposed at one of each of the side walls 98 of the housing and extends inward into the chamber 100, and the slot 90 of the housing 94 extends upward from the bottom wall 96 into the chamber 100.

The housing 84 further includes a front 102 and a rear 104 that is disposed closer to the outlet 46 of the water reservoir assembly 40 than the front 102. The guide-rails 86 and the slot 90 of the housing 84 extend from the front 102 toward the rear 104. The housing 84 further includes an aperture 106 disposed at the front 102 through which the water reservoir assembly 40 slides as the water reservoir assembly 40 moves to, from, and between the fillable state 76 and the water supply state 78. In embodiments, the aperture 106 of the housing 84 is aligned with an aperture 108 through or adjacent to the human-machine interface 34 to allow the water reservoir assembly 40 to move from the water supply state 78 to the fillable state 76 and reveal the inlet 42 to the external environment 28. In embodiments, the faceplate 74 of the water reservoir assembly 40 is disposed within, and flush with, the aperture 108 through or adjacent to the human-machine interface 34, while in the water supply state 78.

The water reservoir assembly 40 further includes a fabric 110. The fabric 110 is disposed proximate the inlet 42 of the water reservoir assembly 40 so that water 48 added to the inlet 42 must flow through the water reservoir assembly 40 before reaching the outlet 46 of the water reservoir assembly 40. The fabric 110 is sufficiently porous to permit passage of water 48 that is deposited into the inlet 42 to flow through the fabric 110 and into the water storage chamber 44 of the water reservoir assembly 40. The oven 10 may then draw the water 48 from the water storage chamber 44 through the outlet 46, as described. However, the fabric 110 acts as a physical barrier that prevents steam that backflows from the steam generation system and into the water storage chamber 44 from escaping out of the inlet 42 and into the external environment 28. Instead of escaping out of the inlet 42, the fabric 110 causes the steam to remain within the water storage chamber 44.

As mentioned, the inlet 42 has the width 66 and the length 68, and the larger the width 66 and length 68 are relative to the width 64 of the water reservoir assembly 40, the easier it is for the user to deposit water through the inlet 42 into the water storage chamber 44. However, without the presence of the fabric 110, the larger the width 66 and length 68 of the inlet 42, the more readily steam would escape from the water storage chamber 44 through the inlet 42 and into the external environment 28. Implementation of the fabric 110 beneficially allows the width 66 and length 68 of the inlet 42 to be relatively large relative to the width 64 of the water reservoir assembly 40 without concern that the relatively large width 66 and length 68 of the inlet 42 would allow steam to escape to the external environment 28. The fabric 110, as mentioned, blocks progression of the steam from the water storage chamber 44 to the external environment 28. In embodiments, the width 66 of the inlet 42 is at least 50% (as mentioned) of the width 64 of the water reservoir assembly 40, such as 50%, 60%, 70%, 80%, 90%, or 95% of the width 64 of the water reservoir assembly 40, or within any range bound by any two of those values (e.g., from 50% to 70%, from 60% to 95%, and so on).

In embodiments, the fabric 110 is non-woven. However, in other embodiments, the fabric 110 is woven. In embodiments, the fabric 110 includes layered sheets 110a, 110b, 110c, . . . 100n (see FIG. 7) of the fabric 110.

In embodiments, as illustrated, the water reservoir assembly 40 further includes a structural support 112 for the fabric 110. The structural support 112 provides support for the fabric 110 and allows the fabric 110 to be placed and maintained proximate to the inlet 42. The structural support 112 is also disposed proximate the inlet 42 and, in embodiments (such as illustrated), extends into the water storage chamber 44. For example, as illustrated, the structural support 112 can include a lip 114 that sits upon the portion of the water reservoir assembly 40 that provides the inlet 42, such as the top piece 70, and support bars 116 that extend downward from the lip 114 and under the fabric 110. The support bars 116 extend through the inlet 42 into the water storage chamber 44.

In embodiments, the fabric 110 is coupled to the structural support 112, such as adhered thereto. Accordingly, the structural support 112 can provide shape to the fabric 110, such as a bowl or funnel shape, where (i) a top portion 118 of the fabric 110 is disposed proximate to, and surrounded by, the inlet 42 of the water reservoir assembly 40 and (ii) a bottom portion 120 of the fabric 110 extends into the water storage chamber 44 and is elevated lower than the top portion 118. In embodiments, the support bars 116 are parallel to the lip 114 under the bottom portion 120 of the fabric 110. In embodiments, however, the bottom portion 120 of the fabric 110 is separated from and does not touch the bottom surface 50 defining the water storage chamber 44. The structural support 112 thus can provide the fabric 110 with a depth 122 (see FIGS. 6 and 7) from the top portion 118 of fabric 110 to the bottom portion 120 of the fabric 110. The depth 122 assists the user in depositing water 48 into the water storage chamber 44 of the water reservoir assembly 40. For example, the depth 122 of the fabric 110 allows the fabric 110 to hold a volume of the water 48 that the user deposits while the water 48 flows through the fabric 110 and into the water storage chamber 44. Without the depth 122, the water 48 that the user deposits may spill to the floor 22 if the rate at which the user deposits water 48 onto the fabric 110 exceeds the rate at which the water 48 deposited flows through the fabric 110 and into the water storage chamber 44. The downward sloping bottom surface 50 allows the water 48 to flow away from the bottom portion 120 of the fabric 110, which allows further water 48 held within the fabric 110 to flow into the water storage chamber 44.

In embodiments, the structural support 112 and the fabric 110 coupled thereto include a separated state 124 (see FIG. 8) and a coupled state 126. In the separated state 124, the structural support 112 and the fabric 110 coupled thereto are separated from the water reservoir assembly 40. In the coupled state 126, the structural support 112 (with the fabric 110) is coupled to the water reservoir assembly 40. The structural support 112 is movable to, from, and between the separated state 124 and the coupled state 126. The structural support 112 having the capability of taking the separated state 124 allows the user to clean or rinse the fabric 110, if necessary. The fabric 110 provides the added benefit of filtering solid matter from the water 48 that the user intends to deposit into the water storage chamber 44. Such filtering of solid matter may improve the efficiency and serviceable life of the steam generating system of the oven 10.

According to a first aspect of the present disclosure, an oven comprises (i) a cooking chamber; (ii) a cabinet at least partially surrounding the cooking chamber; and (iii) a water reservoir assembly comprising (a) an inlet, (b) a water storage chamber, (c) an outlet, (d) a fillable state where the water reservoir assembly is at least partially extracted from the cabinet and the inlet is accessible from an external environment to deposit water into the water storage chamber through the inlet, (e) a water supply state where the water reservoir assembly is inserted further into the oven than in the fillable state and the oven is configured to extract water from the water storage chamber via the outlet to supply steam to the cooking chamber, and (f) a fabric proximate the inlet through which water flows before flowing through the outlet.

According to a second aspect of the present disclosure, the oven of the first aspect is presented, wherein the fabric is sufficiently porous to permit water that is deposited into the inlet to flow through the fabric and into the water storage chamber of the water reservoir assembly.

According to a third aspect of the present disclosure, the oven of any one of the first through second aspects is presented, wherein the fabric prevents at least a portion of steam that backflows through the outlet of the water reservoir assembly and into the water storage chamber from escaping out of the inlet and into the external environment.

According to a fourth aspect of the present disclosure, the oven of any one of the first through third aspects is presented, wherein the water reservoir assembly further comprises a structural support proximate the inlet that extends into the water storage chamber, and the fabric is coupled to the structural support.

According to a fifth aspect of the present disclosure, the oven of any one of the first through fourth aspects is presented, wherein the structural support is movable to, from, and between (i) a separated state where the structural support and the fabric coupled thereto are separated from the water reservoir assembly, and (ii) a coupled state where the structural support and the fabric coupled there to are coupled to the water reservoir assembly.

According to a sixth aspect of the present disclosure, the oven of any one of the first through fifth aspects is presented, wherein the fabric is non-woven.

According to a seventh aspect of the present disclosure, the oven of any one of the first through sixth aspects is presented, wherein the fabric comprises (i) a top portion disposed proximate the inlet of the water reservoir assembly and (ii) a bottom portion that extends into the water storage chamber and that is elevated lower than the top portion.

According to an eighth aspect of the present disclosure, the oven of any one of the first through seventh aspects is presented, wherein the water reservoir assembly further comprises (i) a top piece through which the inlet is disposed, and (ii) a bottom piece that defines the water storage chamber, the bottom piece being coupled to the top piece.

According to a ninth aspect of the present disclosure, the oven of the eighth aspect is presented, wherein (i) the water reservoir assembly further comprises a structural support that sits upon the top piece and extends through the inlet into the water storage chamber and (ii) the fabric is coupled to the structural support.

According to a tenth aspect of the present disclosure, the oven of the ninth aspect is presented, wherein the structural support comprises (i) a lip that sits upon the top piece and (ii) support bars that extend downward from the lip and under the fabric.

According to an eleventh aspect of the present disclosure, the oven of any one of the first through tenth aspects is presented, wherein (i) the water reservoir assembly further comprises a front and a rear and (ii) the water storage chamber comprises a bottom surface that slopes downward from the front to the rear.

According to a twelfth aspect of the present disclosure, the oven of any one of the first through eleventh aspects is presented, wherein (i) the water reservoir assembly further comprises a front and a rear and (ii) the inlet is disposed closer to the front than the rear of the water reservoir assembly.

According to a thirteenth aspect of the present disclosure, the oven of any one of the first through twelfth aspects is presented, wherein (a) the water reservoir assembly further comprises (i) a front that is open to the external environment when the water reservoir assembly is in the water supply state and (ii) a rear that faces an opposite direction as the front; and (b) the inlet is disposed closer to the front of the water reservoir assembly than the rear of the water reservoir assembly.

According to a fourteenth aspect of the present disclosure, the oven of any one of the first through thirteenth aspects is presented, wherein (a) the water reservoir assembly further comprises (i) a front that is open to the external environment when the water reservoir assembly is in the water supply state, (ii) a rear that faces an opposite direction as the front, (iii) a first side and a second side, facing an opposite direction as the first side, that extend between the front and the rear, and (iv) a width between the first side and the second side, the width extending through the inlet; and (b) the inlet has a width that is parallel to the width of the water reservoir assembly, and the width of the inlet is at least 50% of the width of the water reservoir assembly.

According to a fifteenth aspect of the present disclosure, the oven of the fourteenth aspect is presented, wherein the inlet has a length that is orthogonal to the width of the inlet, and the length of the inlet is within a range of from 50% to 150% of the width of the inlet.

According to a sixteenth aspect of the present disclosure, the oven of any one of the first through fifteenth aspects is presented, wherein the fabric comprises layered sheets.

According to a seventeenth aspect of the present disclosure, the oven of any one of the first through sixteenth aspects is presented, wherein (i) the water storage chamber is defined at least in part by a bottom surface and (ii) the fabric is separated from the bottom surface.

According to an eighteenth aspect of the present disclosure, a water reservoir assembly for an oven comprises: (i) a water storage chamber; (ii) an inlet into the water storage chamber configured to accept water for storage in the water storage chamber; (iii) an outlet configured to supply water from the water storage chamber through the outlet to a steam generation system of an oven that is configured to transform the water into steam for use during a cooking operation; and (iv) a fabric proximate the inlet through which water flows to the water storage chamber.

According to a nineteenth aspect of the present disclosure, the water reservoir assembly of the eighteenth aspect is presented further comprising: (i) a top piece through which the inlet is disposed; (ii) a bottom piece that defines the water storage chamber, the bottom piece being coupled to the top piece; and (iii) a structural support that sits upon the top piece and extends through the inlet into the water storage chamber; wherein, the fabric is coupled to the structural support.

According to a twentieth aspect of the present disclosure, the water reservoir assembly of the nineteenth aspect is presented, wherein the structural support comprises (i) a lip that sits upon the top piece and (ii) support bars that extend downward from the lip and parallel to the lip under the fabric.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An oven comprising:
a cooking chamber;
a cabinet at least partially surrounding the cooking chamber;
a water reservoir assembly comprising (a) an inlet, (b) a water storage chamber, (c) an outlet, (d) a fillable state where the water reservoir assembly is at least partially extracted from the cabinet and the inlet is accessible from an external environment to deposit water into the water storage chamber through the inlet, (e) a water supply state where the water reservoir assembly is inserted further into the oven than in the fillable state and the oven is configured to extract water from the water storage container via the outlet to supply steam to the cooking chamber, (f) a structural support proximate the inlet that extends into the water storage chamber, and (g) a fabric proximate the inlet through which water flows before flowing through the outlet, the fabric attached to the structural support, wherein, the fabric prevents at least a portion of steam that backflows through the outlet of the water reservoir assembly and into the water storage chamber from escaping out of the inlet and into the external environment, wherein, the fabric is non-woven, and wherein, the structural support is movable to, from, and between (i) a separated state where the structural support and the fabric attached thereto are separated from the water reservoir assembly, and (ii) a coupled state where the structural support and the fabric attached thereto are coupled to the water reservoir assembly.

2. The oven of claim 1, wherein
the fabric is sufficiently porous to permit water that is deposited into the inlet to flow through the fabric and into the water storage chamber of the water reservoir assembly.

3. The oven of claim 1, wherein
the fabric is adhered to the structural support.

4. The oven of claim 1, wherein
the fabric comprises (i) a top portion disposed proximate the inlet of the water reservoir assembly and (ii) a bottom portion that extends into the water storage chamber and is elevated lower than the top portion.

5. The oven of claim 1, wherein
the water reservoir assembly further comprises (i) a top piece through which the inlet is disposed and (ii) a bottom piece that defines the water storage chamber, the bottom piece being coupled to the top piece.

6. The oven of claim 5, wherein
the structural support sits upon the top piece of the water reservoir assembly in the coupled state.

7. The oven of claim 6, wherein
the structural support comprises (i) a lip that sits upon the top piece while the structural support is in the coupled state and (ii) support bars that extend downward from the lip and under the fabric.

8. The oven of claim 1, wherein
the water reservoir assembly further comprises a front and a rear; and
the water storage chamber comprises a bottom surface that slopes downward from the front to the rear.

9. The oven of claim 1, wherein
the water reservoir assembly further comprises a front and a rear; and
the inlet is disposed closer to the front than the rear of the water reservoir assembly.

10. The oven of claim 1, wherein
the water reservoir assembly further comprises (i) a front that is open to the external environment when the water reservoir assembly is in the water supply state and (ii) a rear that faces an opposite direction as the front; and
the inlet is disposed closer to the front of the water reservoir assembly than the rear of the water reservoir assembly.

11. The oven of claim 1, wherein
the water reservoir assembly further comprises (i) a front that is open to the external environment when the water reservoir assembly is in the water supply state, (ii) a rear that faces an opposite direction as the front, (iii) a first side and a second side, facing an opposite direction as the first side, that extend between the front and the rear, and (iv) a width between the first side and the second side, the width extending through the inlet; and
the inlet has a width that is parallel to the width of the water reservoir assembly, and the width of the inlet is at least 50% of the width of the water reservoir assembly.

12. The oven of claim 11, wherein
the inlet has a length that is orthogonal to the width of the inlet, and the length of the inlet is within a range of from 50% to 150% of the width of the inlet.

13. The oven of claim 1, wherein
the fabric comprises layered sheets.

14. The oven of claim 1, wherein
the water storage chamber is defined at least in part by a bottom surface; and
the fabric is separated from the bottom surface.

15. The oven of claim 1 further comprising:
a human-machine interface usable from the external environment,
wherein, the water reservoir assembly further comprises a faceplate,
wherein, in the water supply state, the faceplate is open to and visible from the external environment, and
wherein, in the water supply state, the faceplate is flush with the human-machine interface.

* * * * *